D. Knowlton,
Pipe Coupling,
Nº 24,809. Patented July 19, 1859.
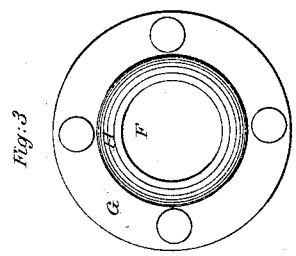
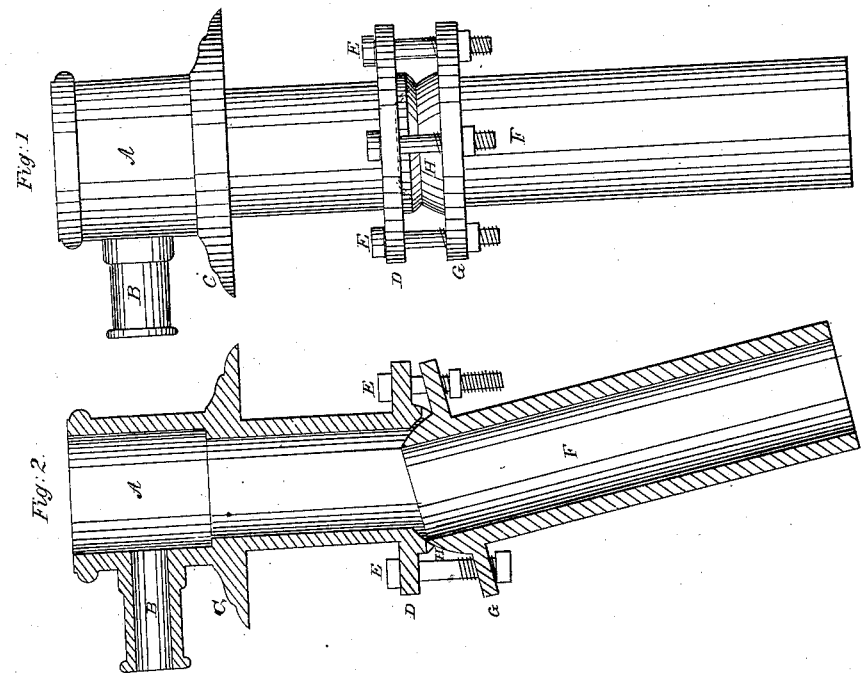
Witnesses:
Inventor:
David Knowlton

UNITED STATES PATENT OFFICE.

DAVID KNOWLTON, OF CAMDEN, MAINE.

JOINT FOR PUMP-PIPES.

Specification of Letters Patent No. 24,809, dated July 19, 1859.

*To all whom it may concern:*

Be it known that I, DAVID KNOWLTON, of Camden, in the county of Waldo and State of Maine, have invented a new, useful, and Improved Hemispherical Joint for Pumps, Pipes, &c.; and I do hereby declare that the same is described and represented in the following specifications and drawings.

To enable others skilled in the art to make and use my invention I will proceed to describe its construction and operation referring to the drawings in which the same letters indicate like parts in each of the figures.

Figure 1 is an elevation of a pump barrel made in two parts and connected by my improved hemispherical joint. Fig. 2, is a section of the same cut through the center. Fig. 4, is a plan of the lower half of the joint.

The nature of my invention and improvement in the joints of pumps, pipes and tubes, consists in making the joint hemispherical, in combination with stiff or rigid flanges around the parts of the pump or pipe joined, so that the parts may be set straight or at the angle desired and fastened firmly in such position by the bolt which draw and hold the parts together.

In the accompanying drawing A, is the upper joint of a pump provided with a spout B, and flange C, by which it may be fastened to the deck of the vessel or other proper support. This upper joint may be made of cast metal or other material and its lower end is provided with a stiff flange D, as shown in the drawing, which is perforated for the bolts E, E, which fasten it to the pipe F, by means of the perforated flange G, which is cast with the pipe F, or otherwise firmly fastened to it so that when the bolts E, E, are screwed up the pump and pipe will be held firmly in the desired position in which they are secured by the bolts. There is a projection H, on the end of the pipe F, above the flange G, the outside of which projection is made in the form of a portion of a hemisphere, as shown in section Fig. 2. And the lower end of the joint A, projects a little below the flange D, and is hollowed out, as shown in section Fig. 2, so as to fit the hemispherical portion H, on the pipe F, and the parts may be ground together with emery and oil or water, so as to make a tight joint, or leather, india rubber, canvas or other packing may be put between the parts before the bolts are screwed up, so as to pack the joint and make it tight. By the use of this hemispherical connection in combination with the stiff or rigid flanges on the pipes or pump the parts may be readily and easily arranged in the position desired, and the bolts screwed up so as to fasten them in that position firmly and inflexibly.

This improved joint is particularly adapted to ships' pumps, as the upper joint may be set at right angle to the deck, and the lower one at such an angle as to avoid cutting the timbers, or keelson, so as to weaken the vessel.

What I claim as my invention and improvement in the above described joint for pumps, pipes, etc., is—

Making the joint hemispherical in combination with the stiff or rigid flanges, by which the parts joined hemispherically may be held at the desired angle substantially as described.

In testimony whereof I have hereunto signed my name before two witnesses.

DAVID KNOWLTON.

Witnesses:
I. DENNIS, Jr.,
EDW. F. BROWN.